United States Patent
Lee et al.

(10) Patent No.: US 7,453,524 B2
(45) Date of Patent: Nov. 18, 2008

(54) METHOD AND DEVICE FOR IMAGE CONTRAST ENHANCEMENT

(75) Inventors: Wei-Kuo Lee, Zhubei (TW); Joseph Lue, Hsinchu (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 578 days.

(21) Appl. No.: 11/245,103

(22) Filed: Oct. 7, 2005

(65) Prior Publication Data

US 2006/0077304 A1 Apr. 13, 2006

(30) Foreign Application Priority Data

Oct. 8, 2004 (TW) .............................. 93130470 A (51) Int. Cl.
*H04N 5/52* (2006.01)

(52) U.S. Cl. ....................................... 348/679; 348/672

(58) Field of Classification Search ................. 348/673, 348/678, 679, 686, 671, 672, 631, 712, 713; 382/167, 168, 274; 345/617; *H04N 5/52, H04N 5/14, 5/57, 5/21, 9/64*
See application file for complete search history.

(56) References Cited

U.S. PATENT DOCUMENTS

| 5,555,026 A * | 9/1996 | Lee .............................. 348/678 |
| 6,781,636 B2 * | 8/2004 | Stessen ....................... 348/678 |
| 7,050,114 B2 * | 5/2006 | Stessen et al. .............. 348/679 |

* cited by examiner

*Primary Examiner*—Sherrie Hsia
(74) *Attorney, Agent, or Firm*—WPAT.,P.C.; Justin King (57) ABSTRACT

The present invention discloses a method and a device for image contrast enhancement by taking the contribution of image chroma into account so as to define the luminance signal with the chroma weighted value. The new defined luminance signal can be applied towards expressing the image's parameters of original luminance signal and compensated chroma signal, through means of a statistic histogram extraction and the ratio relationship between before and after luminance curve process. Therefore, pictures can be provided with better saturation for satisfying the viewer's requirements, as observed from the process of the present invention.

16 Claims, 7 Drawing Sheets

METHOD AND DEVICE FOR IMAGE CONTRAST ENHANCEMENT

BACKGROUND OF THE INVENTION

1. Field of the Invention

The present invention generally relates to a method and a device for image contrast enhancement and, more particularly, to a method and a device for image contrast enhancement by defining luminance signals as compensation parameters.

2. Description of the Prior Art

To date, there exist many conventional approaches to image color enhancement based on the information distribution of luminance signals in a frame histogram, which is a relationship diagram with the amount of corresponding luminance values in an image.

Figure 1:
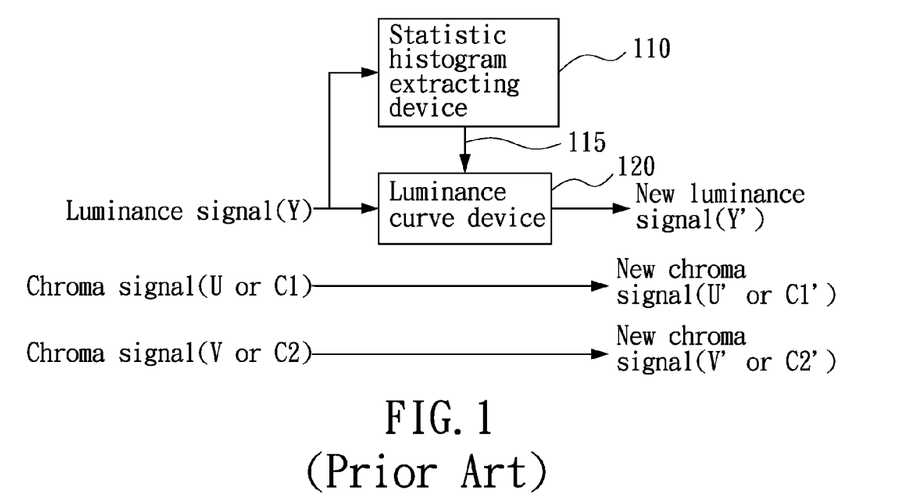
FIG. 1 is a schematic circuit diagram of the prior art for image contrast enhancement with respect to using a statistic histogram.

Please refer to FIG. 1, which is a circuit diagram showing a conventional method for extracting information in the histogram. In FIG. 1, the value of luminance signal (Y) can be figured out by the statistic histogram extracting device 110. Moreover, luminance distribution information 115 corresponding to the luminance value can be obtained in light of the statistic histogram. Due to the luminance distribution information 115, the luminance curve (the relationship curve between luminance and luminance value) device 120 outputs the luminance curve of a new luminance signal (Y').

Accordingly, among the luminance signal (Y), the chroma signal (U or C1), and the chroma signal (V or C2) of every frame in an image, only the luminance signal (Y) is transformed into a new luminance signal (Y') by means of the statistic histogram extracting device 110 and the luminance curve device 120.

In the prior art method, even though image contrast is improved, only the luminance is changed but the chroma is still the same, which leads to the loss of image saturation under some situations. Therefore, blurs occur in images near the interface boundaries between picture patterns, i.e., the side effect.

Figure 2:
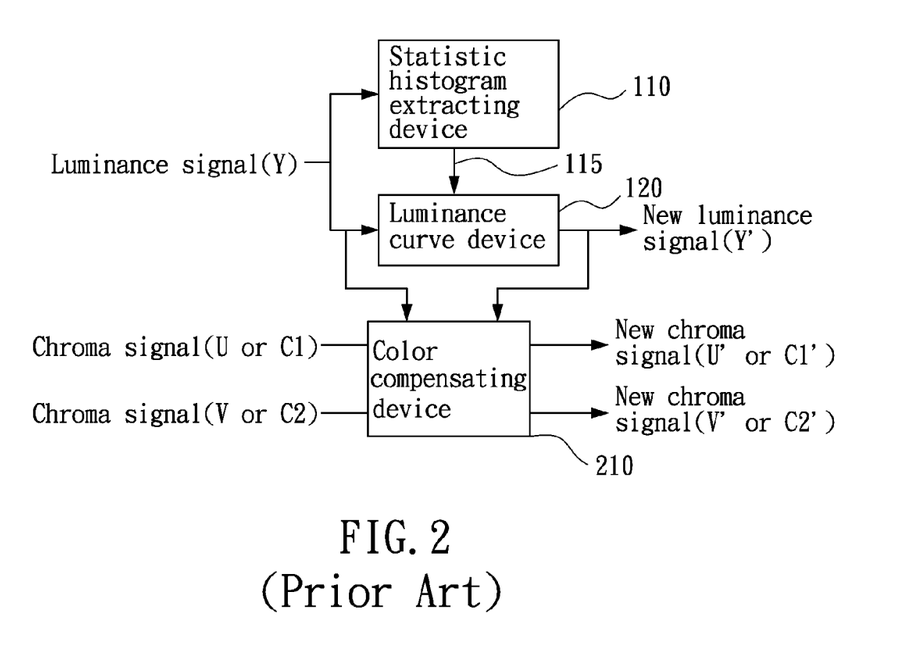
FIG. 2 is another schematic circuit diagram of the prior art for image contrast enhancement.

A conventional method for preventing the side effect is using a statistic histogram extracting device to obtain a new luminance signal and a compensating function to compensate chroma signals. Please refer to FIG. 2, which is another conventional circuit diagram for image contrast enhancement. In FIG. 2, not only the original luminance signal (Y) passes through a statistic histogram extracting device 112 and a luminance curve device 120 as to obtain a new luminance signal (Y'), but also the original chroma signals (U or C1) and (V or C2) pass through a color compensating device 210 as to obtain new chroma signals (U' or C1') and (V' or C2') according to the luminance signal (Y) and the new luminance signal (Y'). The original chroma signals (U or C1) and (V or C2) of every picture pattern in an image can be compensated as to overcome the side effect by using the compensating function of the color compensating device 210.

However, in the prior art method, the image luminance may not meet the viewer's requirements. Therefore, there is need in providing a method and a device for image contrast enhancement such that the image luminance can be adjusted simultaneously under the consideration of image chroma, so as to present better image luminance and image chroma to satisfy the viewer's requirements

SUMMARY OF THE INVENTION

It is a primary object of the present invention to provide a method and a device for image contrast enhancement so as to meet the viewer's requirements.

In order to achieve the foregoing object, the present invention provides a device for image contrast enhancement, comprising: a luminance-defined transforming device, receiving a first luminance signal, a first chroma signal, and a second chroma signal so as to output a second luminance signal; a luminance contrast adjusting device, adjusting the second luminance signal so as to output a third luminance signal; and a luminance and color compensating device, compensating the first luminance signal, the first chroma signal, and the second chroma signal according to the second luminance signal and the third luminance signal.

In one preferred embodiment of the present invention, the luminance-defined transforming device comprises: a first multiplier, multiplying the first luminance signal with a first weighting signal; a second multiplier, multiplying the first chroma signal with a second weighting signal; a third multiplier, multiplying the second chroma signal with a third weighting signal; and an adder, adding outputs of the first, second, and third multipliers so as to output the second luminance signal.

The luminance contrast adjusting device comprises: a statistic histogram extracting device, obtaining a statistic histogram signal according to the second luminance signal; and a luminance curve device, obtaining the third luminance signal according to the second luminance signal and the statistic histogram signal.

The luminance and color compensating device further comprises: an operator, receiving the second luminance signal and the third luminance signal so as to output a parameter signal; a fourth multiplier, multiplying the parameter signal with the first luminance signal; a fifth multiplier, multiplying the parameter signal with the first chroma signal; and a sixth multiplier, multiplying the parameter signal with the second chroma signal.

In another embodiment, the present invention provides a device for image contrast enhancement, comprising: a luminance-defined transforming device, receiving a first luminance signal, a first chroma signal, and a second chroma signal so as to output a second luminance signal; a luminance shifting device, shifting the second luminance signal so as to output a luminance shifting signal; a luminance contrast adjusting device, adjusting the luminance shifting signal so as to output a luminance contrast adjusting signal; a black/white level extending device, receiving the luminance contrast adjusting signal so as to output a third luminance signal; and a luminance and color compensating device, compensating the first luminance signal, the first chroma signal, and the second chroma signal according to the second luminance signal and the third luminance signal.

The present invention further provides a method for image contrast enhancement, comprising steps of: defining a second luminance signal according to a first luminance signal, a first chroma signal, a second chroma signal and at least a weighting signal; obtaining a third luminance signal by using a statistic histogram associated with the second luminance signal; and obtaining a fourth luminance signal by using a luminance curve graph according to the second luminance signal and the third luminance signal.

It is preferable that first luminance signal, the first and second chroma signals are compensated according to the second luminance signal and the fourth luminance signal.

DETAILED DESCRIPTION OF THE PREFERRED EMBODIMENT

Figure 3:
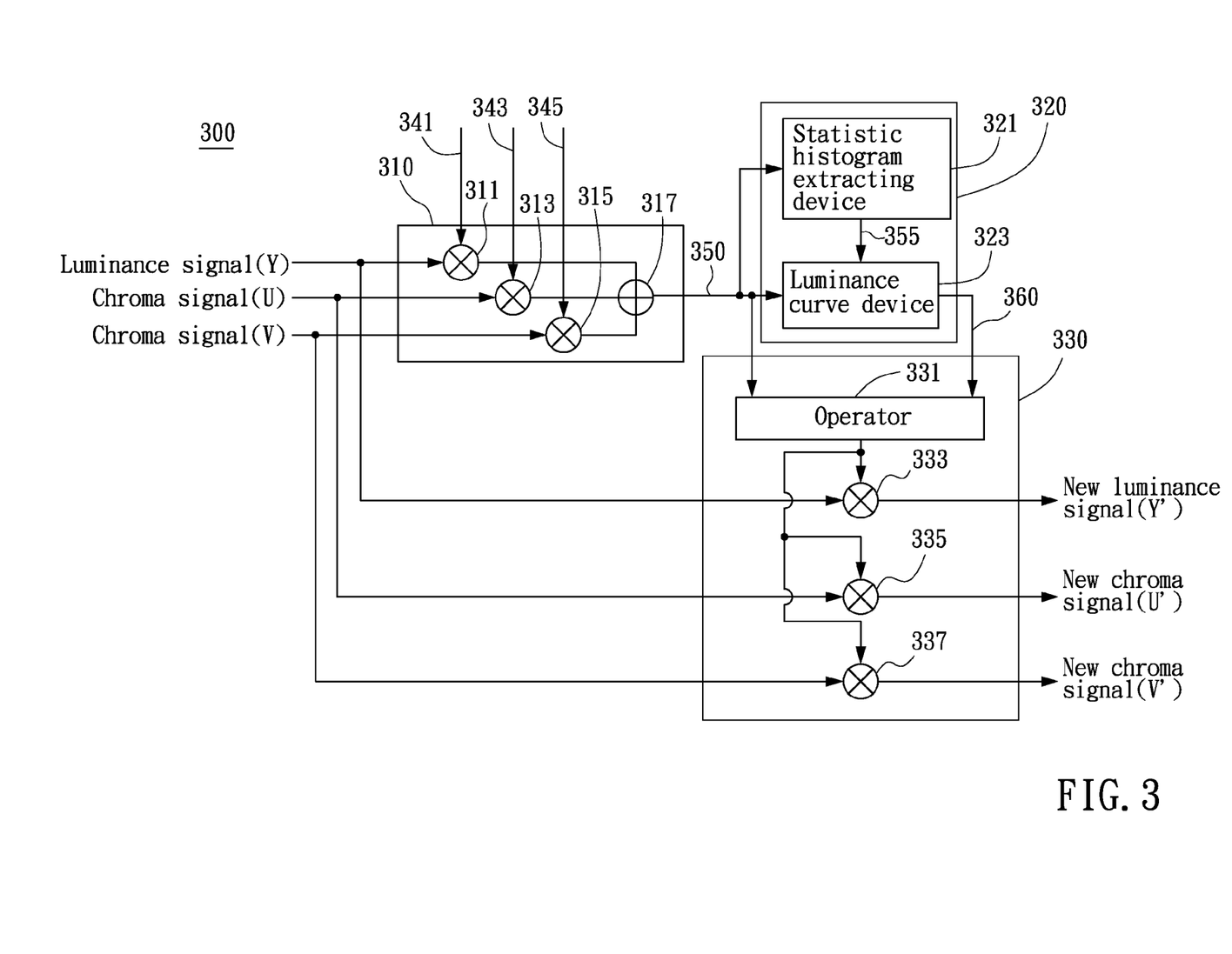
FIG. 3 is a diagram showing a device for image contrast enhancement in accordance with the preferred embodiment of the present invention.

The objects, spirits and advantages of the preferred embodiments of the present invention will be readily understood by the accompanying drawings and detailed descriptions, as described hereinafter:

Please refer to FIG. 3, which is a diagram showing a device for image contrast enhancement in accordance with the preferred embodiment of the present invention. In FIG. 3, the device for luminance contrast enhancement 300 comprises a luminance-defined transforming device 310, a luminance contrast adjusting device 320 and a luminance and color compensating device 330. The luminance-defined transforming device 310, preferably, comprises multipliers 311, 313 and 315, and an adder 317. The luminance contrast adjusting device 320 comprises a statistic histogram extracting device 321 and a luminance curve device 323. The luminance and color compensating device 330, preferably, comprises an operator 331 and multipliers 333, 335, and 337.

Figure 4:
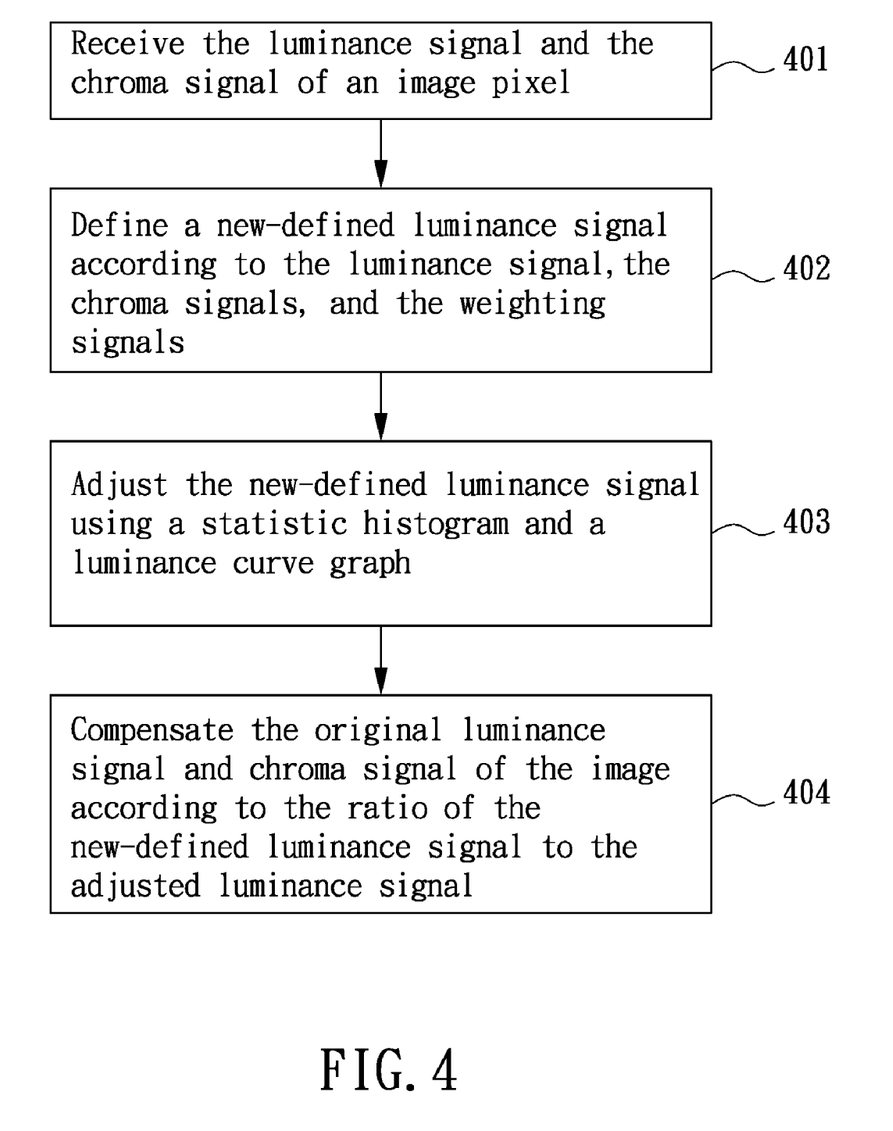
FIG. 4 is a flow chart showing a device for image contrast enhancement in accordance with the preferred embodiment of the present invention.

Please refer to FIG. 4, which is a flow chart showing operation of a device for image contrast enhancement in accordance with the preferred embodiment of the present invention. At first, the multipliers 311, 313, and 315 receive a luminance signal (Y), a chroma signal (U), and a chroma signal (V) of an image, respectively, as described in Step 401. The multipliers 311, 313, and 315 further receive weighting signals 341, 343 and 345, by which the luminance signal (Y), the chroma signal (U) and the chroma signal (V) are multiplied. The adder 317 adds output signals of the multipliers 311, 313, and 315 so as to output the luminance signal 350 which is new-defined, as described in Step 402. The luminance signal (Y), the chroma signal (U), and the chroma signal (V) denote Y, U, and V, respectively. The weighting signals 311, 313, and 315 denote W1, W2, and W3, respectively. The new-defined luminance signal 350 denotes $Y_{new}$ which is expressed as:

$$Y_{new} = W1 \times Y + W2 \times U + W3 \times V.$$

Then, the new-defined luminance signal 350 is regarded as the input of the luminance contrast adjusting device 320, so as to obtain the adjusted luminance signal 360. The distribution amount of gray-level values of the luminance signal 350 in the image is obtained by the luminance signal 350 through the statistic histogram extracting device 321. Then the statistic histogram extracting device 321 outputs the information of luminance distribution 355. The luminance curve device 323 obtains the corresponding transformed luminance curve from the information of luminance distribution 355 according to the luminance signal 350. Then the luminance curve device 323 outputs the luminance signal 360, as described in Step 403.

Finally, the luminance signal (Y) and chroma signals (U) and (V) are compensated by using a luminance and color compensating device 330. A ratio value is obtained by an operator 331 according to the luminance signal 350 as described in Step 402 and the luminance signal 360 as described in Step 403. The ratio value is multiplied by the luminance signal (Y), the chroma signal (U), and the chroma signal (V), respectively, using the multiplier 333,335, and 337 to obtain new luminance signal (Y'), chroma signal (U'), and chroma signal (V'), as described in Step 404.

Figure 5:
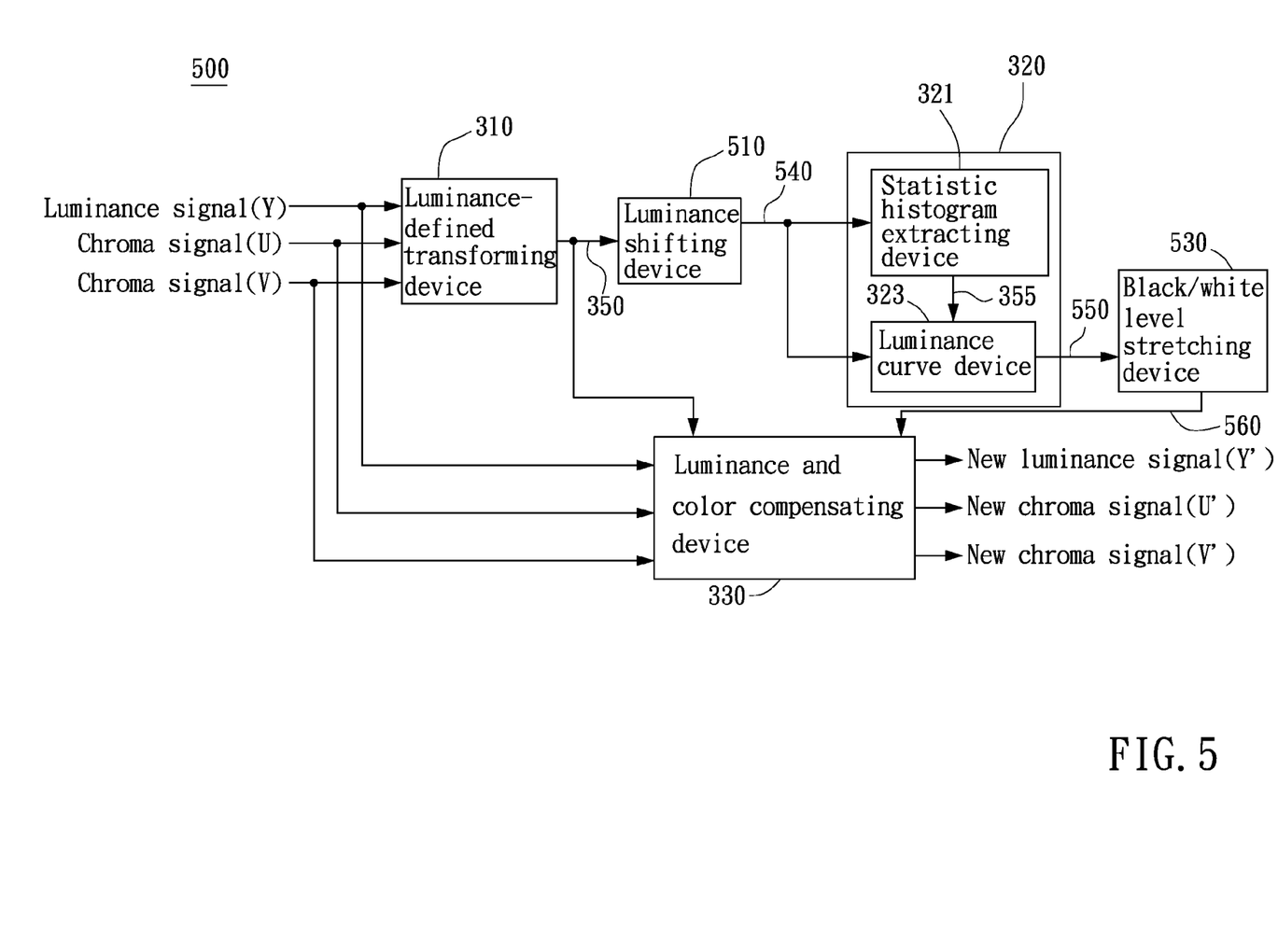
FIG. 5 is a diagram showing a device for image contrast enhancement in accordance with another preferred embodiment of the present invention.

Please refer to FIG. 5, which is a diagram showing a device for image contrast enhancement in accordance with another preferred embodiment of the present invention. The contrast enhancement device 500 comprises a luminance-defined transforming device 310, a luminance contrast adjusting device 320, a luminance and color compensating device 330, and furthermore a luminance shifting device 510 and a black/white level extending device 530. Therefore, the flow chart of the present embodiment is different from the previous one.

Figure 6:
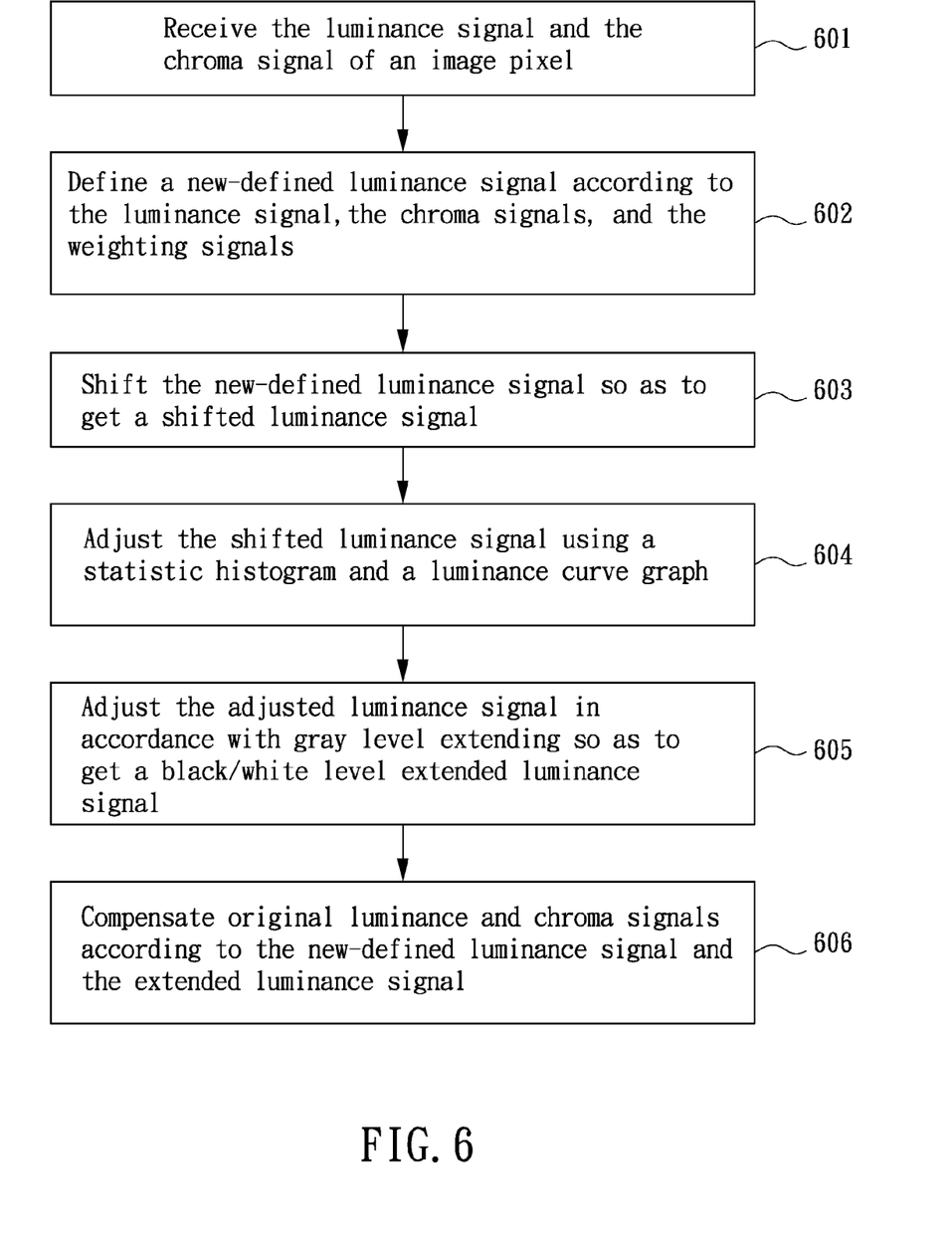
FIG. 6 is a flow chart showing a device for image contrast enhancement in accordance with another preferred embodiment of the present invention.

Please refer to FIG. 6, which is a flow chart showing a device for image contrast enhancement in accordance with another preferred embodiment of the present invention. Steps 601 and 602 are the same as Steps 401 and 402. A shifted luminance signal 540 is obtained by shifting the luminance signal 350 by the luminance shifting device 510, as described in Step 603. Therefore, the input of the luminance contrast adjusting device 320 is replaced by the shifted luminance signal 540. Then the distribution of shifted luminance signal 540 is extracted and the adjusted luminance signal 550 is obtained by using the luminance contrast adjusting device 320, as described in Step 604.

Figure 7:
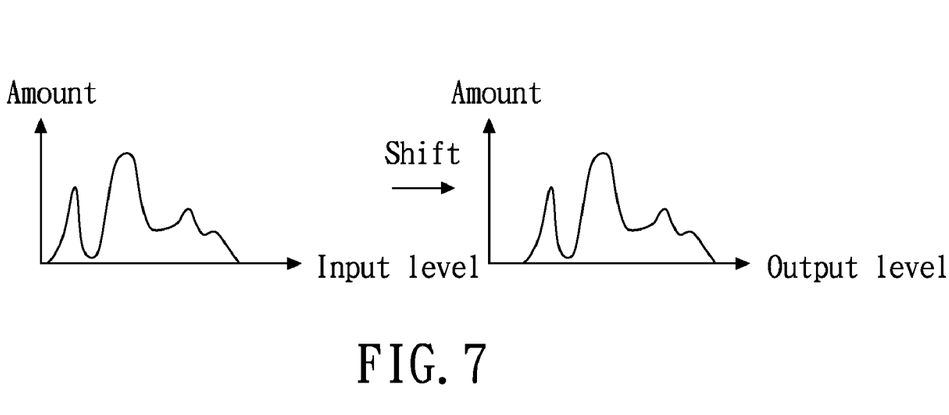
FIG. 7 is a diagram showing output signals of the statistic histogram extracting device from a comparison of before and after shifting of the luminance signal.

Please refer to FIG. 7, which is a diagram showing output signal of the statistic histogram extracting device 321 from a comparison of before and after shifting of the luminance signal. In FIG. 7, the left part is the output of the luminance signal 350 through the statistic histogram extracting device 321, i.e., the diagram of the information of luminance distribution 355; and the right part is the shifted luminance signal 540 through the statistic histogram extracting device 321. As shown in FIG. 7, the shifting of the output signal of the statistic histogram extracting device 321 follows the shifting of the input signal.

Figure 8:
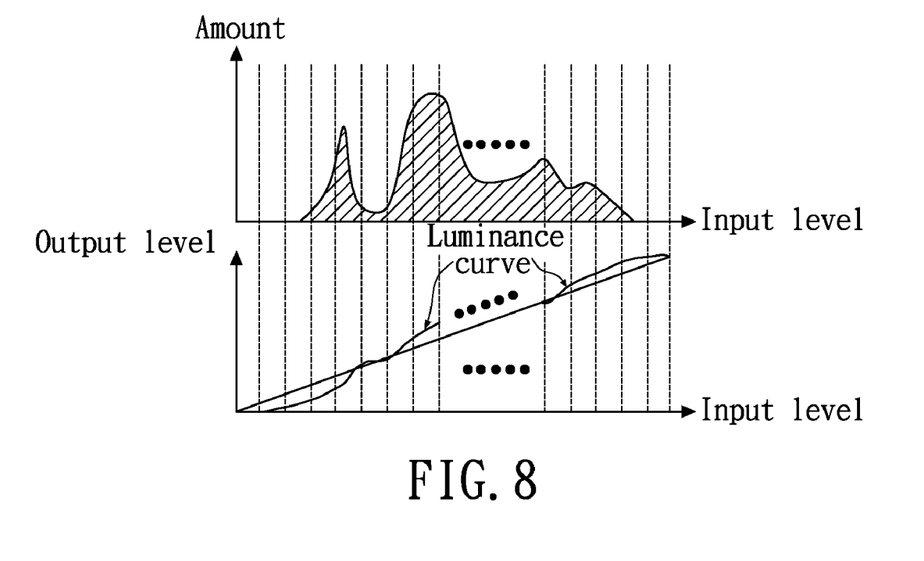
FIG. 8 is a diagram showing a luminance curve obtained by using the luminance curve device.

Please refer to FIG. 8, which is a diagram showing the luminance curve obtained by using the luminance curve device 323. Corresponding luminance curve is obtained from the information of luminance curve 355, which is the output of the statistic histogram extracting device 321, through the transformation of luminance curve device 323. The distribution of luminance curve is varied as the amount of input level for the information of luminance curve, for example, the more amount of input level for the information of luminance cure, the higher slope of the luminance curve.

In addition, the gray level of the luminance signal 550 is adjusted and extended by using the black/white extending device 530 so as to obtain a luminance signal 560, as described in Step 605. Preferably, the extending of gray level for the luminance signal 550 can focus on the neighborhood of a threshold value.

Figure 9:
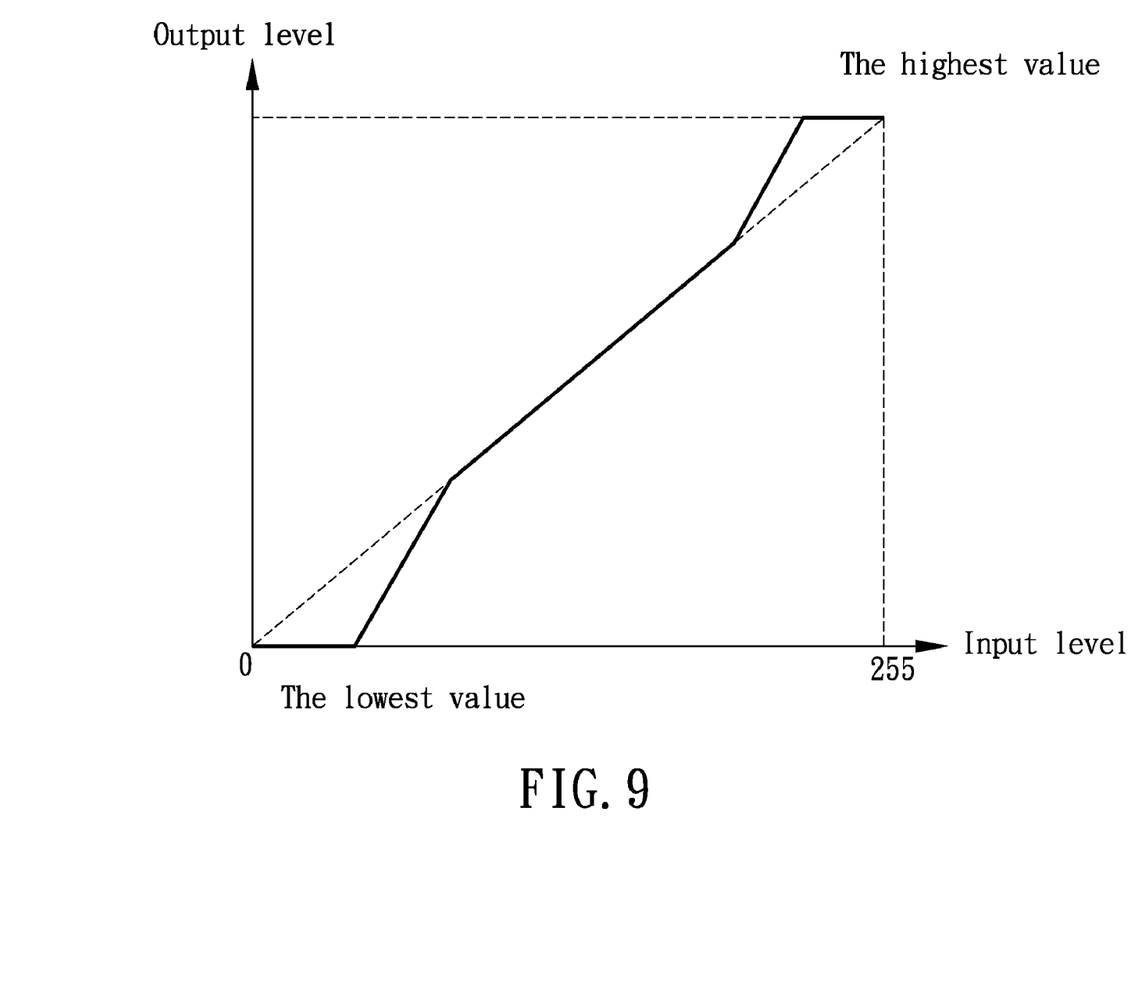
FIG. 9 is a diagram showing the gray level of adjusted luminance signals.

Please refer to FIG. 9, which is a diagram showing the gray level of adjusted luminance signals. The black/white level extending device 530 adjusts the luminance signal 550 in accordance with the input level of the luminance signal 550, wherein the value of the luminance signal 550 is elevated but not to exceed a maximum value while it is close to the maximum value and the value of the luminance signal 550 is reduced but not beneath a minimum value while it is close to the minimum value. Therefore, the input level of the luminance signal 550 is elevated or reduced while it is close to the highest or lowest value. The luminance signal 550 can become brighter in the domain of white level and darker in the domain of black level. As a result, the brightness and contrast of displayed image can appear clearer.

Finally, similar to the Step 404, the luminance and color compensating device 330 can compensate the original luminance signal (Y), chroma signal (U), and chroma signal (V) according to the luminance signal 350 and the luminance signal 560 as described in Step 604 so as to get new luminance signal (Y'), chroma signal (U'), and chroma signal (V'), as described in Step 606.

According to the above discussion, the present invention discloses a method and a device for image contrast enhancement by taking the contribution of image chroma into account, so as to define the luminance signal with the chroma weighted value. The new defined luminance signal can be applied towards expressing the image's parameters of original luminance signal and compensated chroma signal, through means of a statistic histogram extraction and the ratio relationship between before and after luminance curve process. Therefore, pictures can be provided with better saturation for satisfying the viewer's requirements, as observed from the process of the present invention.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims

What is claimed is:

1. A device for image contrast enhancement, comprising:
   a luminance-defined transforming device, receiving a first luminance signal, a first chroma signal, and a second chroma signal so as to output a second luminance signal;
   a luminance contrast adjusting device, adjusting said second luminance signal so as to output a third luminance signal; and
   a luminance and color compensating device, compensating said first luminance signal, said first chroma signal, and said second chroma signal according to said second luminance signal and said third luminance signal.

2. The device for image contrast enhancement as recited in claim 1, wherein said luminance-defined transforming device comprises:
   a first multiplier, multiplying said first luminance signal with a first weighting signal;
   a second multiplier, multiplying said first chroma signal with a second weighting signal;
   a third multiplier, multiplying said second chroma signal with a third weighting signal; and
   an adder, adding outputs of said first multiplier, said second multiplier, and said third multipliers so as to output said second luminance signal.

3. The device for image contrast enhancement as recited in claim 1, wherein said luminance contrast adjusting device comprises:
   a statistic histogram extracting device, obtaining a statistic histogram signal according to said second luminance signal; and
   a luminance curve device, obtaining said third luminance signal according to said second luminance signal and said statistic histogram signal.

4. The device for image contrast enhancement as recited in claim 1, wherein said luminance and color compensating device comprises:
   an operator, receiving said second luminance signal and said third luminance signal so as to output a parameter signal;
   a fourth multiplier, multiplying said parameter signal with said first luminance signal;
   a fifth multiplier, multiplying said parameter signal with said first chroma signal; and
   a sixth multiplier, multiplying said parameter signal with said second chroma signal.

5. A device for image contrast enhancement, comprising:
   a luminance-defined transforming device, receiving a first luminance signal, a first chroma signal, and a second chroma signal so as to output a second luminance signal;
   a luminance shifting device, shifting said second luminance signal so as to output a luminance shifting signal;
   a luminance contrast adjusting device, adjusting said luminance shifting signal so as to output a luminance contrast adjusting signal;
   a black/white level extending device, receiving said luminance contrast adjusting signal so as to output a third luminance signal; and
   a luminance and color compensating device, compensating said first luminance signal, said first chroma signal, and said second chroma signal according to said second luminance signal and said third luminance signal.

6. The device for image contrast enhancement as recited in claim 5, wherein said luminance-defined transforming device comprises:
   a first multiplier, multiplying said first luminance signal with a first weighting signal;
   a second multiplier, multiplying said first chroma signal with a second weighting signal;
   a third multiplier, multiplying said second chroma signal with a third weighting signal; and
   an adder, adding outputs of said first multiplier, said second multiplier, and said third multipliers so as to output said second luminance signal.

7. The device for image contrast enhancement as recited in claim 5, wherein said luminance contrast adjusting device comprises:
   a statistic histogram extracting device, obtaining a statistic histogram signal according to said luminance shifting signal; and
   a luminance curve device, obtaining said luminance contrast adjusting signal according to said luminance shifting signal and said statistic histogram signal.

8. The device for image contrast enhancement as recited in claim 5, wherein said luminance and color compensating device, further comprising:
   an operator, receiving said second luminance signal and said third luminance signal so as to output a parameter signal;
   a fourth multiplier, multiplying said parameter signal with said first luminance signal;

a fifth multiplier, multiplying said parameter signal with said first chroma signal; and a sixth multiplier, multiplying said parameter signal with said second chroma signal.

9. A method for image contrast enhancement, comprising steps of:

defining a second luminance signal according to a first luminance signal, a first chroma signal, a second chroma signal and at least a weighting signal;

obtaining a third luminance signal by using a statistic histogram associated with said second luminance signal; and obtaining a fourth luminance signal by using a luminance curve graph according to said second luminance signal and said third luminance signal.

10. The method for image contrast enhancement as recited in claim 9, further comprising steps of:

compensating said first luminance signal, said first chroma signal, and said second chroma signal according to said second luminance signal and said fourth luminance signal.

11. The method for image contrast enhancement as recited in claim 10, wherein said compensating step is according to a ratio between said second luminance signal and said fourth luminance signal.

12. The method for image contrast enhancement as recited in claim 9, wherein said luminance curve graph is determined according to said third luminance signal.

13. A method for image contrast enhancement, comprising steps of:

defining a second luminance signal according to a first luminance signal, a first chroma signal, a second chroma signal and at least a weighting signal;

shifting said second luminance signal so as to obtain a shifted signal;

obtaining a third luminance signal by using a statistic histogram associated with said shifted signal; and obtaining a fourth luminance signal by using a luminance curve graph according to said shifted signal and said third luminance signal.

14. The method for image contrast enhancement as recited in claim 13, further comprising steps of:

extending the black/white level of said fourth luminance signal to a extended luminance signal; and compensating said first luminance signal, said first chroma signal, and said second chroma signal according to said second luminance signal and said extended luminance signal.

15. The method for image contrast enhancement as recited in claim 14, wherein said compensating step is according to a ratio between said second luminance signal and said extended luminance signal.

16. The method for image contrast enhancement as recited in claim 13, wherein said luminance curve graph is determined according to said third luminance signal.

* * * * *